US010713760B2

(12) United States Patent
Pines et al.

(10) Patent No.: US 10,713,760 B2
(45) Date of Patent: Jul. 14, 2020

(54) CONFIGURATION FOR RENDERING VIRTUAL REALITY WITH AN ADAPTIVE FOCAL PLANE

(71) Applicant: THOMSON Licensing, Issy-les-Moulineaux (FR)

(72) Inventors: Joshua Pines, San Francisco, CA (US); Peter Lopez, Los Altos, CA (US); Kiran Varanasi, Cesson-Sevigne (FR)

(73) Assignee: Thomson Licensing, Cesson-Sevigne (FR)

( * ) Notice: Subject to any disclaimer, the term of this patent is extended or adjusted under 35 U.S.C. 154(b) by 0 days.

(21) Appl. No.: 16/066,310

(22) PCT Filed: Dec. 22, 2016

(86) PCT No.: PCT/EP2016/082428
§ 371 (c)(1),
(2) Date: Jun. 27, 2018

(87) PCT Pub. No.: WO2017/114755
PCT Pub. Date: Jul. 6, 2017

(65) Prior Publication Data
US 2019/0012771 A1    Jan. 10, 2019

Related U.S. Application Data

(60) Provisional application No. 62/273,833, filed on Dec. 31, 2015.

(51) Int. Cl.
*G06T 5/00*    (2006.01)
*H04N 13/383*    (2018.01)
(Continued)

(52) U.S. Cl.
CPC .......... *G06T 5/002* (2013.01); *G02B 27/0075* (2013.01); *G02B 27/017* (2013.01);
(Continued)

(58) Field of Classification Search
None
See application file for complete search history.

(56) References Cited

U.S. PATENT DOCUMENTS

10,007,350 B1 *    6/2018    Holz ..................... G06F 3/017
2011/0228051 A1 *    9/2011    Dedeoglu ............ H04N 13/296
348/46
(Continued)

FOREIGN PATENT DOCUMENTS

EP    3035681    6/2016

OTHER PUBLICATIONS

Hillaire et al., "Depth-of-Field Blur Effects for First-Person Navigation in Virtual Environments", IEEE Computer Graphics and Applications, vol. 28, No. 6, Nov.-Dec. 2008, pp. 47-55.

*Primary Examiner* — Yi Wang
(74) *Attorney, Agent, or Firm* — Vincent E. Duffy (57) ABSTRACT

A virtual reality apparatus includes a virtual reality display screen. Further, the virtual reality apparatus includes an eye tracking system that tracks a gaze direction of one or more eyes of a user to determine an object of focus in a virtual reality display. In addition, the virtual reality apparatus includes a processor. The virtual reality apparatus also includes a memory having a set of instructions that when executed by the processor causes the virtual reality apparatus to estimate one or more pupil dimensions of the one or more eyes based upon a luminance of virtual reality imagery displayed by the virtual reality display. The virtual reality apparatus is further caused to determine a focal plane based upon the estimated one or more pupil dimensions.

27 Claims, 5 Drawing Sheets

(51) Int. Cl.
  *H04N 13/344* (2018.01)
  *H04N 13/122* (2018.01)
  *G02B 27/01* (2006.01)
  *G02B 27/00* (2006.01)
  *G06K 9/00* (2006.01)

(52) U.S. Cl.
  CPC ........ *G06K 9/00604* (2013.01); *H04N 13/122* (2018.05); *H04N 13/344* (2018.05); *H04N 13/383* (2018.05); *G06T 2207/10012* (2013.01)

(56) References Cited

U.S. PATENT DOCUMENTS

| | | |
|---|---|---|
| 2013/0050432 A1 | 2/2013 | Perez et al. |
| 2013/0215105 A1* | 8/2013 | Yonezu .................. G06T 15/10 345/419 |
| 2013/0335404 A1 | 12/2013 | Westerinen et al. |
| 2016/0171704 A1* | 6/2016 | Raghoebardajal ... H04N 13/122 345/633 |
| 2017/0178375 A1* | 6/2017 | Benishti ............... G06K 9/0061 |

\* cited by examiner

CONFIGURATION FOR RENDERING VIRTUAL REALITY WITH AN ADAPTIVE FOCAL PLANE

This application claims the benefit, under 35 U.S.C. § 365 of International Application PCT/EP2016/082428, filed Dec. 22, 2016, which was published in accordance with PCT Article 21(2) on Jul. 6, 2017, in English, and which claims the benefit of U.S. Provisional Application No. 62/273,833 filed Dec. 31, 2015.

BACKGROUND

1. Field

This disclosure generally relates to the field of computing systems. More particularly, the disclosure relates to virtual reality systems.

2. General Background

Virtual reality ("VR") systems simulate a physical presence for a user in a real world environment. The simulation is artificially generated by providing the user with various sensory experiences, e.g., sight, sound, touch, smell, etc. Some current VR systems are implemented via a stereoscopic display device. The stereoscopic display device provides an illusion of depth in an image via stereopsis, i.e., presenting a first image to a first eye and a second image to a second eye of a user to artificially generate a 3D image from 2D images.

VR glasses are an example of a VR system that utilizes stereopsis. For instance, VR glasses typically include head mounted display screens that cover the direct and peripheral vision of both eyes of a user. The VR glasses display two images of the same 3D scene, which are then synthesized by a computer graphics system with a corresponding amount of parallax that renders the 3D scene in a realistic manner. Parallax is the difference in the perceived position of an object viewed from two different lines of sight. A realistic rendering of a 3D scene typically has a larger parallax for nearby objects and a smaller parallax for distant objects. Some VR systems may also utilize a stereographic image capture rig to capture the images for display by the VR glasses. The stereographic image capture rig captures an image as a three hundred sixty degree panorama so that a viewer utilizing the VR system may perform head rotation when utilizing the VR system to look around at different objects in the virtual environment provided by the VR system.

SUMMARY

A virtual reality apparatus includes a virtual reality display screen. Further, the virtual reality apparatus includes an eye tracking system that tracks a gaze direction of one or more eyes of a user to determine an object of focus in a virtual reality display. In addition, the virtual reality apparatus includes a processor. The virtual reality apparatus also includes a memory having a set of instructions that when executed by the processor causes the virtual reality apparatus to estimate one or more pupil dimensions of the one or more eyes based upon a luminance of virtual reality imagery displayed by the virtual reality display. The virtual reality apparatus is further caused to determine a focal plane based upon the estimated one or more pupil dimensions. Further, the virtual reality apparatus is caused to generate a synthetic depth of field based upon the focal plane. In addition, the virtual reality apparatus is caused to apply a blurring effect to one or more pixels of the virtual reality display based upon the one or more pixels being outside of the synthetic depth of field.

Further, a process tracks, with an eye tracking system, a gaze direction of one or more eyes of a user to determine an object of focus in a virtual reality display of a virtual reality apparatus. In addition, the process estimates, with a processor one or more pupil dimensions of the one or more eyes based upon a luminance of virtual reality imagery displayed by the virtual reality display. The process also determines, with the processor, a focal plane based upon the estimated one or more pupil dimensions. Further, the process generates, with the processor, a synthetic depth of field based upon the focal plane. In addition, the process applies, with the processor, a blurring effect to one or more pixels of the virtual reality display based upon the one or more pixels being outside of the synthetic depth of field.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A configuration for rendering VR with an adaptive focal plane is provided. Although prior VR systems were able to generate parallax in the context of synthetic 3D scenes where the 3D world geometry was lighted and rendered utilizing a computer graphics pipeline, such VR systems typically displayed all objects in focus. In other words, all virtual objects remained in focus in the foreground and background of an object at which the user was focused. Such an environment has an unrealistic appearance as the human visual system relies on the focal plane in addition to parallax. In other words, a realistic environment has an object in the plane of focus at a particular depth that appears clear to the user whereas objects in planes that are in the foreground or background have a certain amount of blur.

Although various systems have attempted to apply blur to portions of the virtual environment by tracking the user's eyes and measuring pupil dilation to determine an object of focus to display clearly and other objects to apply blur, such systems typically utilize complex image processing. For example, such systems analyze images of the pupils to determine if the pupils are dilated to apply more blur to simulate a low DoF, i.e., the depth in front of and behind an object in focus such that the depth is perceivably in focus, that results from large pupil dilation or to determine if the pupils are constricted to apply less blur to simulate high DoF of small pupil dilation. In other words, DoF measures the distance between the nearest and farthest objects in a scene that should appear in focus whereas objects outside of that distance should have a certain amount of blur. In contrast, the configuration for rendering VR with an adaptive focal plane estimates the diameter of a user's pupils based on the luminance of a virtual scene. As a result, the computational efficiency, e.g., processing speed, of a VR system is improved as the pupil diameter estimation is more efficient than image processing of pupil dilation. Further, the configuration for rendering VR with an adaptive focal plane reduces the cost of prior VR systems as equipment for complex image analysis is unnecessary for the configuration for rendering VR with an adaptive focal plane in contrast with prior VR systems.

The configuration for rendering VR with an adaptive focal plane is also more accurate than prior VR systems. For example, a user's pupils in a real outdoor scene would be constricted such that all objects in the scene are in focus. When viewing a similar scene in a VR environment, the user may reduce the display brightness, which may lead to pupil dilation that is not commensurate with that of the real world scene. Prior VR systems applied blur to foreground and background objects based on the measured pupil dilation even though the user was looking at a scene that was brightly lit in the virtual environment. In other words, the user may have expected to view all of the objects in the virtual scene in focus, but may view blur with respect to certain foreground and background objects as a result of prior VR systems utilizing measured pupil dilation for blur application. In contrast, the configuration for rendering VR with an adaptive focal plane improves upon prior VR systems by providing more accuracy for blur application since the luminance of the scene is utilized as a criteria for blur application. For example, the configuration for rendering VR with an adaptive focal plane would not apply as much blur to a sunlit VR scene for which the user has reduced the display brightness since the luminance of the sunlit VR scene has not been changed by the user.

Figure 1:
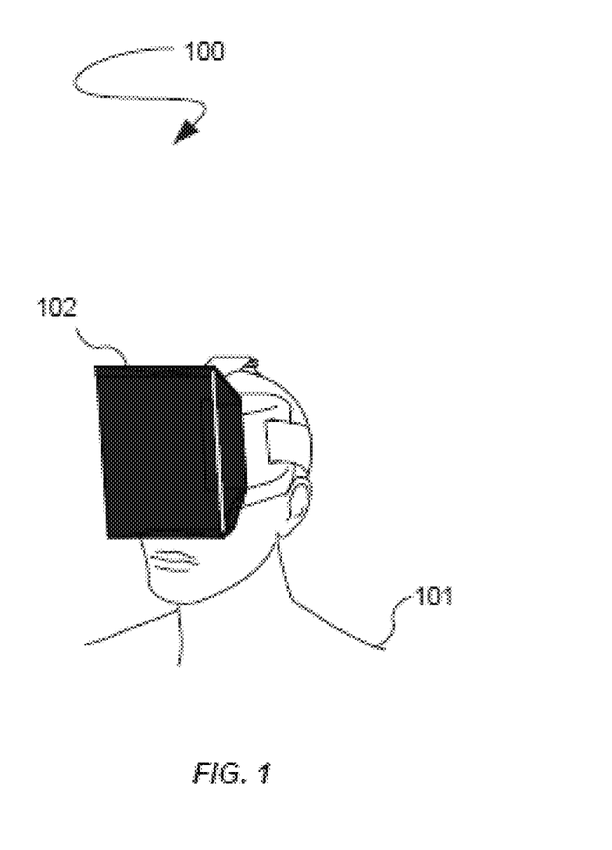
FIG. 1. Illustrates a VR configuration in which a user utilizes a head mounted VR device to view a VR environment.
Figure 2:
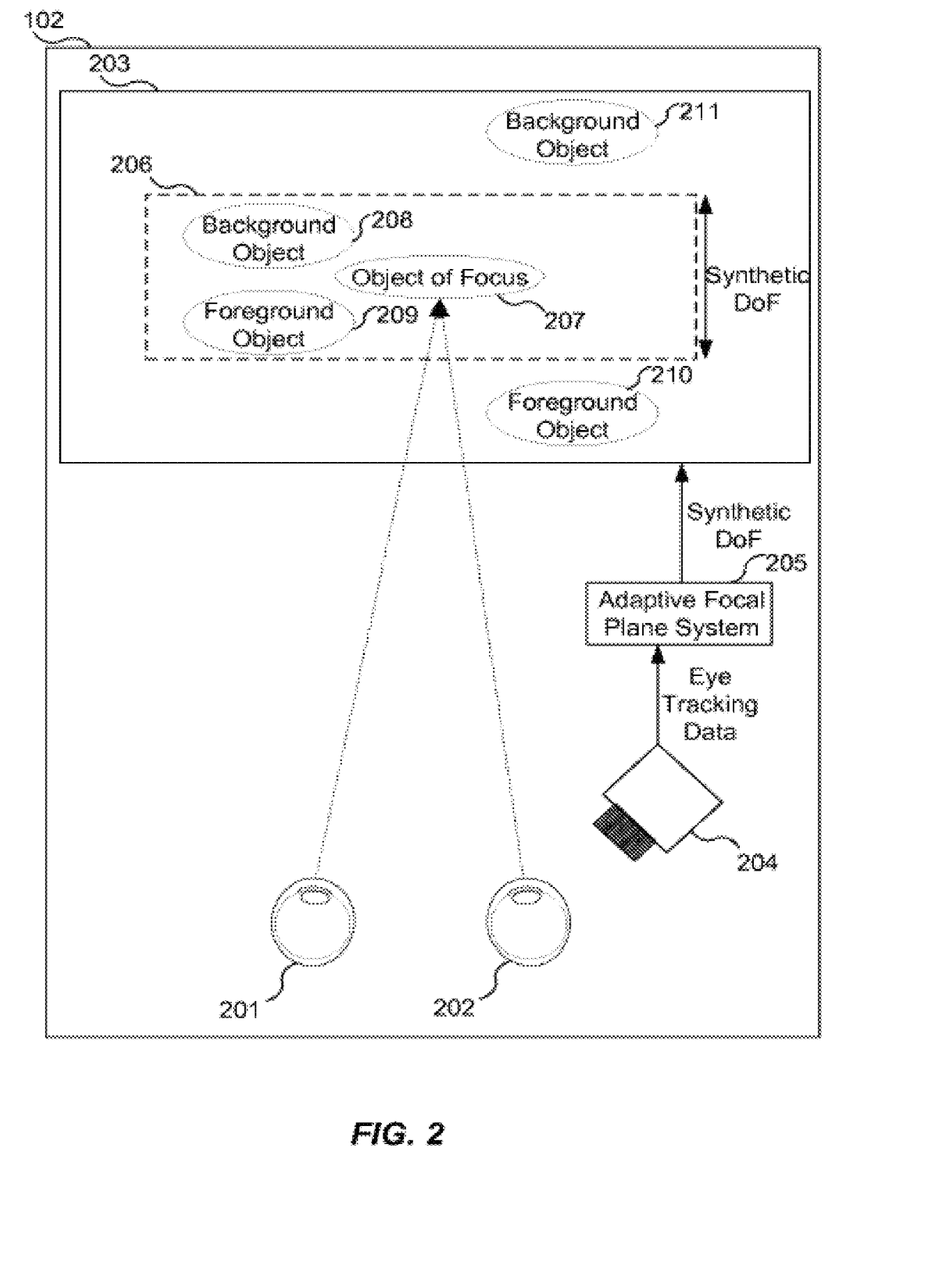
FIG. 2 illustrates a top view of the internal components of the VR head mounted device as viewed by the user illustrated in FIG. 1.

FIG. 1. Illustrates a VR configuration 100 in which a user 101 utilizes a head mounted VR device 102 to view a VR environment. The user 101 views a VR display screen 203, as illustrated in FIG. 2, positioned within the head mounted VR device 102. In various embodiments, the VR environment has captured stereographic images of real world imagery, which are rendered in the VR environment as synthetic imagery. The user 101 may navigate the VR environment via various modalities, e.g., head turning, providing voice inputs to a microphone positioned on head mounted VR device 102, providing touch inputs to actuators positioned on the head mounted VR device 102, providing touch inputs to actuators located in proximity to the VR head mounted device 102, etc. A variety of head mounting devices, e.g., strap configurations, may be utilized for effectuating the head mounting of the VF device 102 to the head of the user 101. Although the VR configuration 100 is illustrated as utilizing a head mounted VR device 102, various other embodiments of VR systems include a VR display screen that is positioned at a distance from the user and changes the VR environment based upon tracked head movement of the user with respect to the VR display screen. Therefore, the VR configuration 100 is not limited to a particular VR system.

FIG. 2 illustrates a top view of the internal components of the VR head mounted device 102 as viewed by the user 101 illustrated in FIG. 1. The user 101 views the display screen 203 to perceive various objects 207-211 in the VR environment. For example, the left eye 201 and the right eye 202 of the user 101 gaze at an object of focus 207. An eye tracking system 204, e.g., one or more image capture devices, captures the gaze of the eyes 201 and 202 to determine the object of focus 207. The eye tracking system 204 provides the captured eye tracking data to an adaptive focal plane system 205.

In various embodiments, the eye tracking system 204 may have a camera coordinate system, e.g., x and y coordinates, for each of the eyes 201 and 202. A world geometry may be represented according to the camera coordinate system for each of the eyes 201 and 202 such that each of the eyes 201 and 202 is considered to be at the origin of the world geometry. The eye tracking system 204 estimates the viewing direction of each of the eyes 201 and 202 in terms of (x,y) pixel coordinates on the VR display screen 203.

The adaptive focal plane system 205 utilizes the viewing direction of the captured eye tracking data to estimate a focal plane 206 for the eyes 201 and 202. In various embodiments, the adaptive focal plane system 205 estimates the focal plane 206 as a single focal plane 206 on the basis that the eyes 201 and 202 are gazing at the same point of the object of focus 207. In various other embodiments, the adaptive focal plane system 205 estimates different focal planes for each of the eyes 201 and 202 based on the eyes 201 and 202 gazing at different points of an object or different objects in the VR environment.

The adaptive focal plane system 205 then estimates a pupil dilation of the eyes 201 and 202 based upon the luminance of the VR display screen 203. For example, the adaptive focal plane system 205 may estimate a large pupil dilation of the eyes 201 and 202 if the VR display screen 203 emits imagery having a low luminance. Such pupil constriction correlates to pupil dilation of a real world scene having minimal lighting. As another example, the adaptive focal plane system 205 may generate a small pupil dilation of the eyes 201 and 202 if the VR display screen 203 emits imagery having a large luminance. Such pupil dilation correlates to pupil constriction of a real world scene having optimal lighting or nearly optimal lighting such that pupil dilation is unnecessary to perceive objects in that real world scene.

The adaptive focal plane system 205 generates a synthetic DoF based on the estimated focal plane 206. The adaptive focal plane system 205 allows, or modifies, the pixels of objects within the synthetic DoF to be clear whereas the adaptive focal plane system 205 applies blur to objects outside of the synthetic DoF if blur has not already been applied. For instance, the pixels of the object of focus 207 are unmodified, or are modified by the adaptive focal plane system 205 to remove any blur, as the object of focus 207 is intended to be clearly viewed and perceived by the user 101. In addition, foreground objects and/or background objects within the synthetic DoF are also intended to be clearly viewed and perceived by the user 101. Therefore, the adaptive focal plane system 205 allows, or modifies, pixels of such objects to be viewed without any blur.

The example of the DoF illustrated by FIG. 2 is a low DoF that results from an estimation of significant pupil dilation based on low luminance emitted by the VR display screen 203. For instance, the DoF is illustrated as only extending forward and backward from the object of focus 207 a minimal distance that is less than the entirety of the VR display screen 203. As a result, the adaptive focal plane system 205 does not apply blur to the foreground object 209 and the background object 208 that are present within the DoF, but applies blur to the foreground object 210 and the background object 211 that are outside of the DoF.

In various embodiments, the luminance is predetermined since the imagery of the VR environment displayed by the VR display screen 203 is synthetic imagery. In other words, the luminance of a particular scene does not change even if the user adjusts various inputs such as brightness. For example, luminance scene values may be encoded into video frames that are provided to the adaptive focal plane system 205, e.g., via streaming, downloading, etc., so that the adaptive focal plane system 205 determines a predetermined luminance associated with a particular scene. In various embodiments, the adaptive focal plane system 205 may determine the particular scene by analyzing a code displayed by the VR display screen 203 that is associated with a particular VR scene, analyzing metadata received from the VR display screen 203, performing image analysis to determine a scene that is predetermined to be associated with particular images, etc.

The blur data is determined by the adaptive focal plane system 205, which may send such data to the VR display screen 203 for rendering. In other words, the adaptive focal plane system 205 may alter the display data to blur certain objects or portions of objects that are outside of the synthetic DoF. The VR display screen 203 may then render that altered data.

Although the adaptive focal plane system 205 is illustrated as a single system, in various embodiments, multiple systems may be utilized to perform the functionality of the adaptive focal plane system 205. For example, a first system may estimate the pupil dimensions based upon luminance, a second system may determine the focal plane or adapt an existing focal plane based upon the pupil dimension estimates, a third system may generate a synthetic DoF based upon the focal plane, and a fourth system may perform blur application based upon the synthetic DoF. Various other numbers of systems may be utilized to perform the different functionality.

Figure 3:
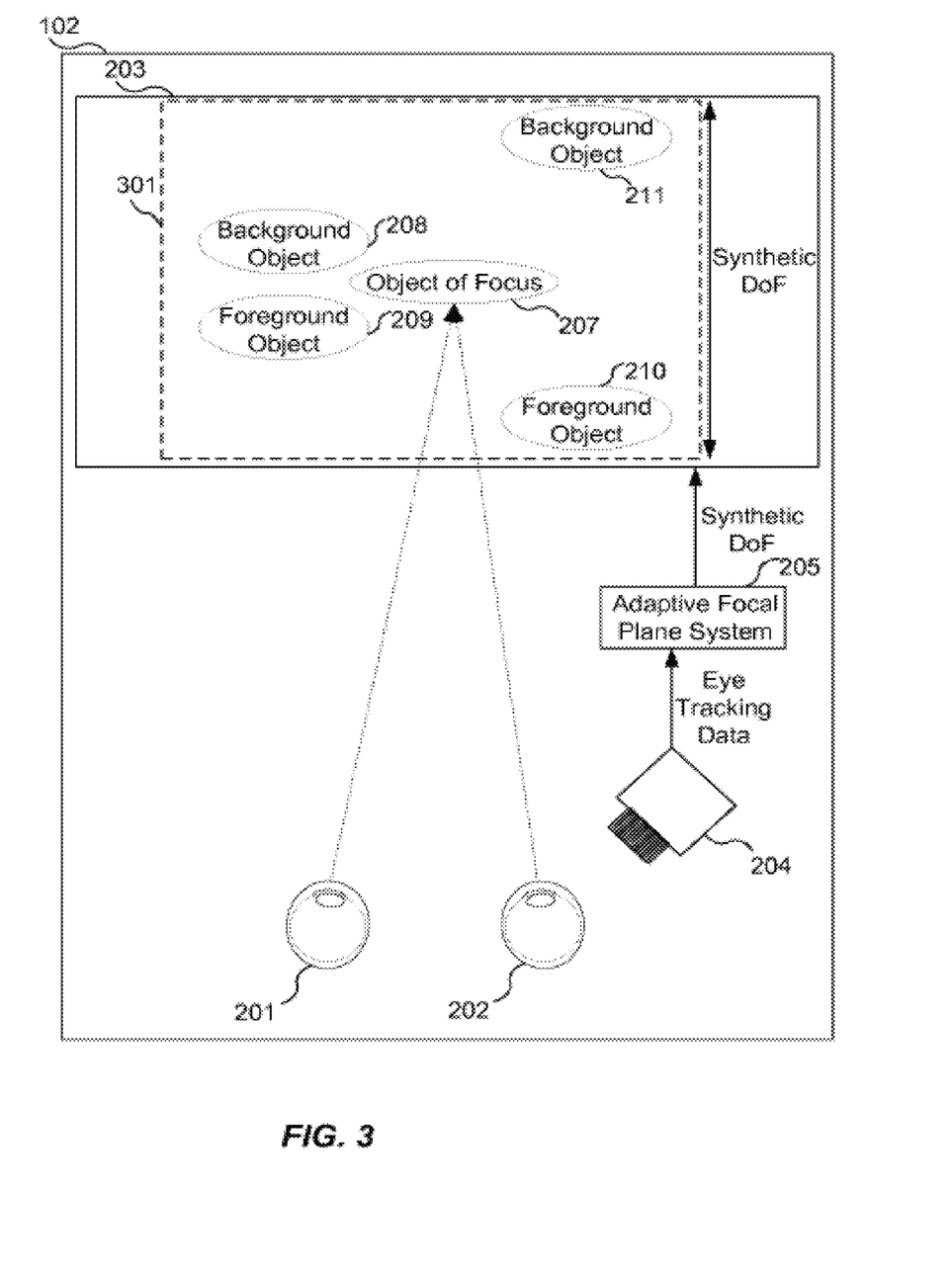
FIG. 3 illustrates the top view of the internal components of the VR head mounted device with a different focal plane and corresponding depth of field ("DoF").

The adaptive focal plane system 205 adapts the focal plane to various pupil size estimations. FIG. 3 illustrates the top view of the internal components of the VR head mounted device 102 with a different focal plane 301 and corresponding DoF. As an example, the adaptive focal plane system 205 of FIG. 3 estimates a small pupil dilation of the eyes 201 and 202, i.e., pupil constriction that results from optimal or nearly optimal luminance emitted from the VR display screen 203. As a result, the adaptive focal plane system 205 calculates a high DoF such that all of the objects 207-211 are rendered clearly by the VR display device 203.

Figure 4:
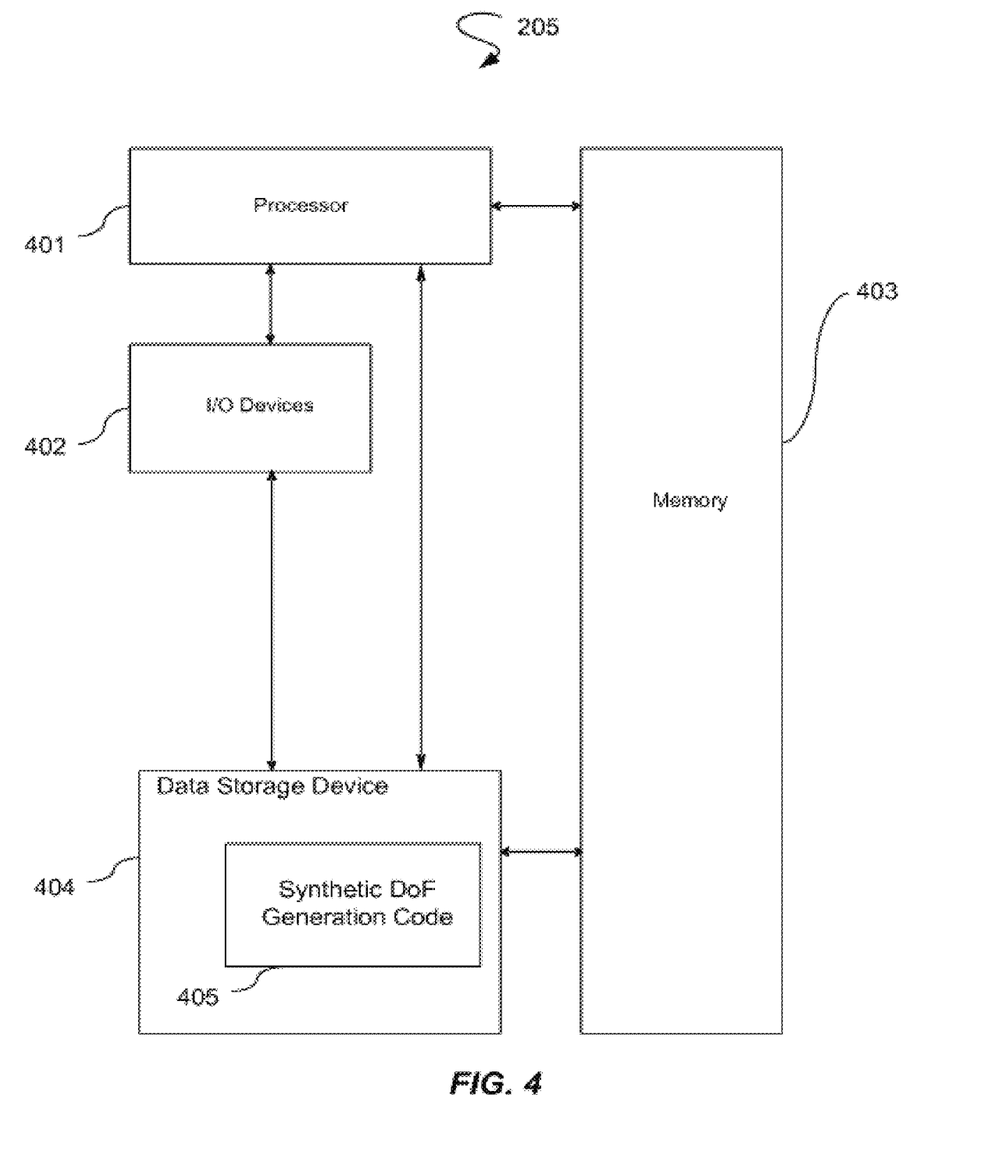
FIG. 4 illustrates the internal components of the adaptive focal plane system illustrated in FIGS. 2 and 3.

FIG. 4 illustrates the internal components of the adaptive focal plane system 205 illustrated in FIGS. 2 and 3. The adaptive focal plane system 205 comprises a processor 401, various input/output devices 402, e.g., audio/video outputs and audio/video inputs, storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device such as a keyboard, a keypad, a mouse, and the like, or a microphone for capturing speech commands, a memory 403, e.g., random access memory ("RAM") and/or read only memory ("ROM"), a data storage device 404, and synthetic DoF generation code 405.

The processor 401 may be a specialized processor that is specifically configured execute the synthetic DoF generation code 405 to generate a synthetic DoF that is utilized to determine which portions of a VR scene are blurred or are not blurred. In contrast with previous computing systems that utilized computationally intensive image processing to determine pupil dilation, the processor 401 utilizes a more computationally efficient estimation of pupil dilation that is based upon luminance data. Therefore, the processor 401 improves the functioning of a computer by improving the processing speed of blur application to render realistic VR scenery.

Further, the processor 401 improves the accuracy of a computer by utilizing luminance values to generate a more accurate synthetic DoF than via determining pupil dilation via image processing. In other words, the processor 401 determines what pupil dilation should be based upon a particular luminance value of predetermined synthetic imagery rather than a particular brightness level that may have been adjusted by the user 101 and may have an effect on pupil dilation. Thus, the use of luminance of synthetic imagery is a more accurate determining factor for generating a synthetic DoF than pupil dilation that may be affected by other constraints such as brightness adjustments.

Figure 5:
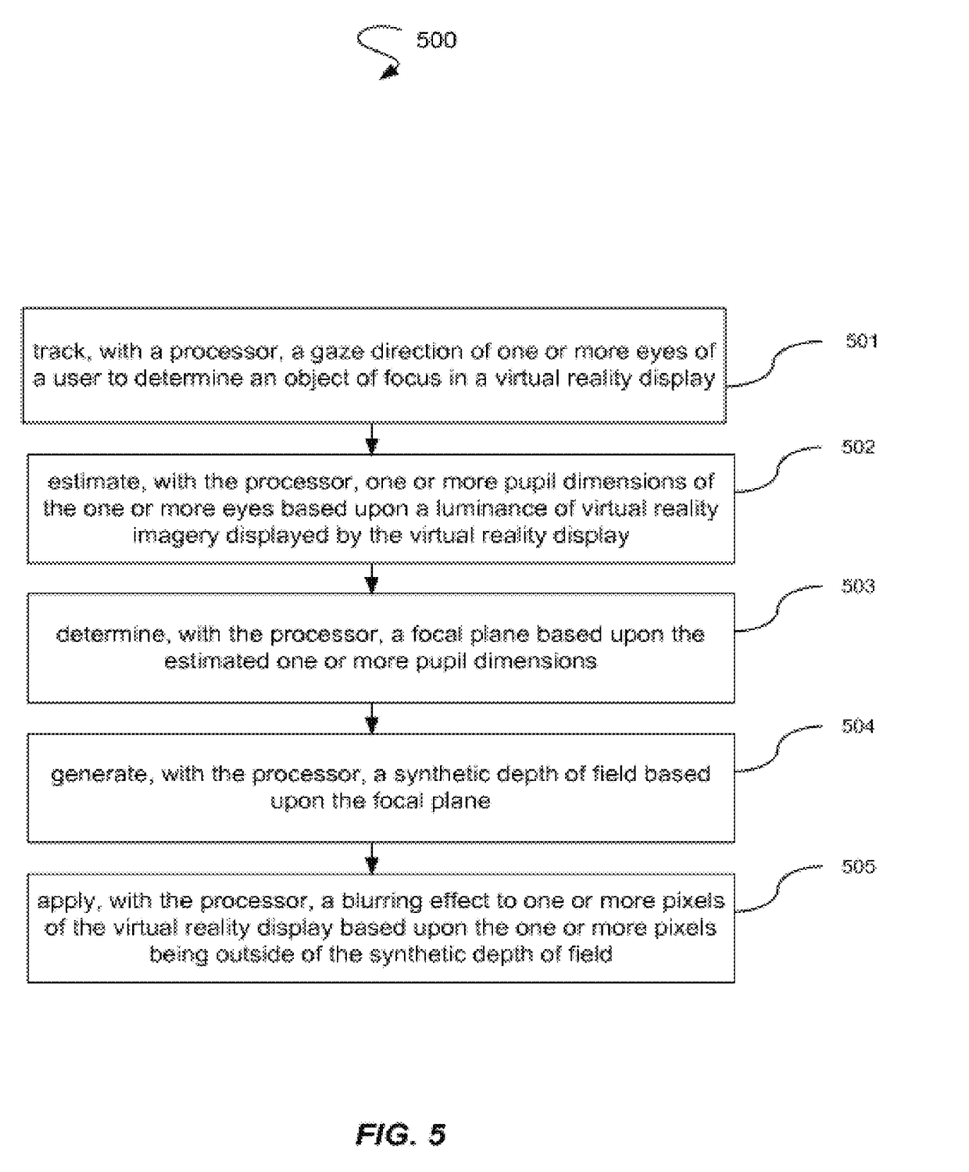
FIG. 5 illustrates a process that is utilized by the adaptive focal plane system to adapt a focal plane based upon luminance.

FIG. 5 illustrates a process 500 that is utilized by the adaptive focal plane system 205 to adapt a focal plane based upon luminance. At a process block 501, the process 500 tracks, with the eye tracking system 204, a gaze direction of one or more eyes 201 and 202 of a user 101 to determine an object of focus 207 in a virtual reality display 203 of a virtual reality apparatus 102. In addition, at a process block 502, the process 500 estimates, with a processor 401, one or more pupil dimensions of the one or more eyes 201 and 202 based upon a luminance of virtual reality imagery displayed by the virtual reality display 203. At a process block 503, the process 500 also determines, with the processor 401, a focal plane 206 based upon the estimated one or more pupil dimensions. Further, at a process block 504, the process 500 generates, with the processor 401, a synthetic DoF based upon the focal plane 206. In addition, at a process block 505, the process 500 applies, with the processor 401, a blurring effect to one or more pixels of the virtual reality display 203 based upon the one or more pixels being outside of the synthetic depth of field.

The processes described herein may be implemented by the processor 401 illustrated in FIG. 4. Such a processor will execute instructions, either at the assembly, compiled or machine-level, to perform the processes. Those instructions can be written by one of ordinary skill in the art following the description of the figures corresponding to the processes and stored or transmitted on a computer readable medium such as a computer readable storage device. The instructions may also be created using source code or any other known computer-aided design tool. A computer readable medium may be any medium capable of carrying those instructions and include a CD-ROM, DVD, magnetic or other optical disc, tape, silicon memory, e.g., removable, non-removable, volatile or non-volatile, packetized or non-packetized data through wireline or wireless transmissions locally or remotely through a network. A computer is herein intended to include any device that has a general, multi-purpose or single purpose processor as described above.

Although the configurations described herein are directed toward VR systems, such configurations may also be utilized in the context of augmented reality ("AR") systems. AR systems typically utilize a display system, e.g., a head mounted system such as a pair of glasses, that overlays virtual imagery over real world imagery. As a result, a user is able to view real world scenery with a virtual imagery overlay. The configurations provided for herein may be utilized to adjust the focal plane of the virtual imagery based upon a pupil dilation estimate generated from luminance values of that virtual imagery so that the virtual imagery appears more realistic.

The use of "and/or" and "at least one of" (for example, in the cases of "A and/or B" and "at least one of A and B") is intended to encompass the selection of the first listed option (A) only, or the selection of the second listed option (B) only, or the selection of both options (A and B). As a further example, in the cases of "A, B, and/or C" and "at least one of A, B, and C," such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items as listed.

It is understood that the processes, systems, apparatuses, and compute program products described herein may also be applied in other types of processes, systems, apparatuses, and computer program products. Those skilled in the art will appreciate that the various adaptations and modifications of the embodiments of the processes, systems, apparatuses, and compute program products described herein may be configured without departing from the scope and spirit of the present processes and systems. Therefore, it is to be understood that, within the scope of the appended claims, the present processes, systems, apparatuses, and compute program products may be practiced other than as specifically described herein.

The invention claimed is:

1. A virtual reality apparatus comprising:
   a virtual reality display screen;
   an eye tracking system that tracks a gaze direction of one or more eyes of a user to determine an object of focus in a virtual reality display;
   a processor; and
   a memory having a set of instructions that when executed by the processor causes the virtual reality apparatus to:
   determine a particular scene of virtual reality imagery by analyzing from data associated with said virtual reality imagery, said data comprising a code displayed by the virtual reality display screen, said code being associated with said particular scene;
   extract a predetermined luminance value associated with the particular scene of virtual reality imagery by analyzing said frame data associated with the virtual reality imagery;
   adapt a pupil dimension for the one or more eyes from one or more various predetermined pupil dimensions, the pupil dimension being associated with said predetermined luminance value of the virtual reality imagery displayed by the virtual reality display screen;
   determine a focal plane based upon the pupil dimensions for the one or more eyes associated with the predetermined luminance;
   generate a synthetic depth of field based upon the focal plane; and
   apply a blurring effect to one or more pixels of the virtual reality display based upon the one or more pixels being outside of the synthetic depth of field.

2. The virtual reality apparatus of claim 1, wherein the processor further causes the virtual reality apparatus to remove a previous blurring effect from one or more pixels of the virtual reality display based upon the one or more pixels being inside of the synthetic depth of field.

3. The virtual reality apparatus of claim 1, wherein the eye tracking system comprises one or more image capture devices.

4. The virtual reality apparatus of claim 1, wherein the eye tracking system tracks the gaze direction via pixel coordinates in the virtual reality display.

5. The virtual reality apparatus of claim 1, wherein the virtual reality imagery is captured stereographic imagery of real world scenery.

6. The virtual reality apparatus of claim 1, further comprising a mounting device that mounts the virtual reality apparatus to a head of a user.

7. The virtual reality apparatus of claim 1, wherein the one or more pixels outside of the synthetic depth of field correspond to a foreground object that is outside of the synthetic depth of field and in front of an object of focus.

8. The virtual reality apparatus of claim 1, wherein the one or more pixels outside of the synthetic depth of field correspond to a background object that is outside of the synthetic depth of field and in back of an object of focus.

9. The virtual reality apparatus of claim 1, wherein the processor further causes the virtual reality apparatus to provide a panoramic view of the virtual reality imagery.

10. A method comprising:
    tracking, with an eye tracking system, a gaze direction of one or more eyes of a user to determine an object of focus in a virtual reality display of a virtual reality apparatus;
    determining, with a processor, a particular scene of virtual reality imagery by analyzing frame data associated with said virtual reality imagery, said data comprising a code displayed by the virtual reality display screen, said code being associated with said particular scene;
    extracting, by a processor, a predetermined luminance value associated with the particular scene of virtual reality imagery by analyzing said frame data associated with the virtual reality imagery;
    adapting, with the processor, a pupil dimension for the one or more eyes from one or more various predetermined pupil dimensions the pupil dimension being associated with said determined luminance value of the virtual reality imagery displayed by the virtual reality display screen;
    determining, with the processor, a focal plane based upon the dimensions for the one ore more eyes associated with the predetermined luminance;
    generating, with the processor, a synthetic depth of field based upon the focal plane; and
    applying, with the processor, a blurring effect to one or more pixels of the virtual reality display based upon the one or more pixels being outside of the synthetic depth of field.

11. The method of claim 10, further comprising removing, with the processor, a previous blurring effect from one or more pixels of the virtual reality display based upon the one or more pixels being inside of the synthetic depth of field.

12. The method of claim 10, wherein the eye tracking system comprises one or more image capture devices.

13. The method of claim 10, further comprising tracking, with the eye tracking system, the gaze direction via pixel coordinates in the virtual reality display.

14. The method of claim 10, wherein the virtual reality imagery is captured stereographic imagery of real world scenery.

15. The method of claim 10, wherein the virtual reality apparatus includes a mounting device that mounts the virtual reality apparatus to a head of a user.

16. The method of claim 10, wherein the one or more pixels outside of the synthetic depth of field correspond to a foreground object that is outside of the synthetic depth of field and in front of an object of focus.

17. The method of claim 10, wherein the one or more pixels outside of the synthetic depth of field correspond to a background object that is outside of the synthetic depth of field and in back of an object of focus.

18. The method of claim 10, further comprising providing a panoramic view of the virtual reality imagery.

19. A non-transitory computer-readable medium storing computer-executable program instructions for performing a method comprising:

tracking, with an eye tracking system, a gaze direction of one or more eyes of a user to determine an object of focus in a virtual reality display of a virtual reality apparatus;

determining, with a processor, a particular scene of virtual reality imagery by analyzing frame data associated with said virtual reality imagery, said frame data comprising a code displayed by the virtual reality display screen, said code being associated with said particular scene;

extracting, by a processor, a predetermined luminance value associated with the particular scene of virtual reality imagery by analyzing said frame data associated with the virtual reality imagery;

adapting, with the processor, a pupil dimension for the one or more eyes from one or more various predetermined pupil dimensions, the pupil dimension being associated with said determined luminance value of the virtual reality imagery displayed by the virtual reality display screen;

determining, with the processor, a focal plane based upon the pupil dimensions for the one or more eyes associated with the predetermined luminance;

generating, with the processor, a synthetic depth of field based upon the focal plane; and applying, with the processor, a blurring effect to one or more pixels of the virtual reality display based upon the one or more pixels being outside of the synthetic depth of field.

20. The non-transitory computer-readable medium of claim 19, further comprising removing, with the processor, a previous blurring effect from one or more pixels of the virtual reality display based upon the one or more pixels being inside of the synthetic depth of field.

21. The non-transitory computer-readable medium of claim 19, wherein the eye tracking system comprises one or more image capture devices.

22. The non-transitory computer-readable medium of claim 19, further comprising tracking, with the eye tracking system, the gaze direction via pixel coordinates in the virtual reality display.

23. The non-transitory computer-readable medium of claim 19, wherein the virtual reality imagery is captured stereographic imagery of real world scenery.

24. The non-transitory computer-readable medium of claim 19, wherein the virtual reality apparatus includes a mounting device that mounts the virtual reality apparatus to a head of a user.

25. The non-transitory computer-readable medium of claim 19, wherein the one or more pixels outside of the synthetic depth of field correspond to a foreground object that is outside of the synthetic depth of field and in front of an object of focus.

26. The non-transitory computer-readable medium of claim 19, wherein the one or more pixels outside of the synthetic depth of field correspond to a background object that is outside of the synthetic depth of field and in back of an object of focus.

27. The non-transitory computer-readable medium of claim 19, further comprising providing a panoramic view of the virtual reality imagery.

\* \* \* \* \*